US008628108B2

(12) United States Patent
Gingras et al.

(10) Patent No.: US 8,628,108 B2
(45) Date of Patent: Jan. 14, 2014

(54) LIGHT WEIGHT FOLDABLE AND CUSTOMIZABLE WHEELCHAIR

(75) Inventors: David Gingras, Mascouche (CA); Éric Simoneau, Laval (CA); Pierre-André Couture, Terrebonne (CA)

(73) Assignee: Motion Composites Inc., Saint-Roch-de-l'Achigan (CA)

( * ) Notice: Subject to any disclaimer, the term of this patent is extended or adjusted under 35 U.S.C. 154(b) by 359 days.

(21) Appl. No.: 12/988,581

(22) PCT Filed: Apr. 28, 2008

(86) PCT No.: PCT/CA2008/000807
§ 371 (c)(1),
(2), (4) Date: Jan. 11, 2011

(87) PCT Pub. No.: WO2009/132409
PCT Pub. Date: Nov. 5, 2009

(65) Prior Publication Data

US 2011/0175329 A1 Jul. 21, 2011

(51) Int. Cl.
*B62B 3/02* (2006.01)

(52) U.S. Cl.
USPC .............................. 280/647; 280/650; 280/42

(58) Field of Classification Search
USPC ........................................... 280/650, 42, 647
See application file for complete search history.

(56) References Cited

U.S. PATENT DOCUMENTS

| | | | | | |
|---|---|---|---|---|---|
| 1,831,641 | A | * | 11/1931 | Skinner | 285/197 |
| 2,721,582 | A | * | 10/1955 | Hoke | 138/99 |
| 4,405,142 | A | * | 9/1983 | Whetstine | 280/250.1 |
| 5,857,688 | A | | 1/1999 | Swearingen | |
| 5,915,709 | A | | 6/1999 | Radjenovic et al. | |
| 6,098,492 | A | * | 8/2000 | Juchniewicz et al. | 74/551.3 |
| 6,227,559 | B1 | | 5/2001 | Slagerman et al. | |
| 6,264,218 | B1 | * | 7/2001 | Slagerman | 280/43 |
| 6,270,105 | B1 | | 8/2001 | Friedrich | |
| 6,932,369 | B2 | * | 8/2005 | Walsh et al. | 280/250.1 |
| 2004/0173991 | A1 | * | 9/2004 | Watterton et al. | 280/281.1 |
| 2006/0145456 | A1 | * | 7/2006 | Munsey et al. | 280/649 |

* cited by examiner

*Primary Examiner* — J. Allen Shriver, II
*Assistant Examiner* — Bryan Evans
(74) *Attorney, Agent, or Firm* — Norton Rose Fulbright Canada LLP

(57) ABSTRACT

A light weight foldable and customizable wheelchair (4) is described. It is comprised of a tubular frame (9) formed at least in part of molded polymer matrix composite material tubes and connectors. The wheelchair has two side frame tubular assemblies (9, 9') interconnected in side-by-side relationship by a pair of cross-brace (8, 8') members. The side frame tubular assemblies define a seating section (6) therebetween. A rear wheel mounting post (80) is secured to each of the side frame assemblies adjacent a rear end section thereof for securing a rear wheel (86) to each of the side frame tubular assemblies (9, 9') at a desired selected position. A front wheel assembly (7, 7') is secured to a lowermost front end of each of the side frame tubular assemblies. The seating section (6) is configurable along three axes. Each of the side frame tubular assemblies (9, 9') is adjustable in depth and in height, constituting a first and second of the three axes, by cutting tubes (70', 70", 71, 72) of the side frame tubular assemblies to a desired length and gluing them to associated ones of the connectors (71', 71", 72', 73). Each cross-brace member (8, 8') of the pair of cross-brace members, have a cross-brace connecting tube (30) adjustable in length to provide a width adjustment which constitutes a third of the three axes of the side frame tubular assemblies. A pair of back canes (10) is secured to the two side tubular assemblies (9, 9').

15 Claims, 23 Drawing Sheets

LIGHT WEIGHT FOLDABLE AND CUSTOMIZABLE WHEELCHAIR

TECHNICAL FIELD

The present invention relates generally to wheel chairs, and more particularly to an ultra light wheelchair having a modular polymer matrix composite material frame that can be easily custom fitted for disabled persons of different sizes and statures. The modular frame provides a seating section which is configurable along three different axes whereby to provide for depth, height and width adjustment thereof.

BACKGROUND ART

It is known to construct wheelchairs with tubular members such as light hollow metal tubes in an attempt to reduce weight of the structures while preserving strength. It is also known to provide lateral adjustment of the seating section of the wheelchair. The tubular frames of these wheelchairs are also provided with multiple connectors and bolts in their assemblies. Because these wheelchairs are often carelessly manipulated and transported, these connectors loosen and are damaged or lost and frequent maintenance is therefore required. The rigidity of these frames also transmits vibrations to the user person when the chair is displaced on a rough surface. These vibrations, over long term, cause discomfort and pain to the user.

SUMMARY OF THE INVENTION

It is a feature of the present invention to provide a wheelchair which substantially overcomes the above-mentioned disadvantages and provides additional advantages.

Another feature of the present invention is to provide a wheelchair wherein the frame thereof is constructed of molded modular composite polymer materials whereby to provide a wheelchair frame which is strong and ultra light weight.

Another feature of the present invention is to provide a light weight foldable and customizable wheelchair wherein the frame members are modular members constructed of polymer matrix composite hollow tubular members which can be cut to length and bonded together by glue whereby there are fewer bolts in the assembly which can become disconnected.

Another feature of the present invention is to provide a foldable and customizable wheelchair wherein the support frame can be configured along three different axes to provide adjustment of the seating section in height, depth and width.

Another feature of the present invention is to provide a light weight foldable and customizable wheelchair having a tubular frame constructed of modular polymer matrix composite material with a lug and standard tube construction.

Another feature of the present invention is to provide a light weight foldable and customizable wheelchair which can be constructed to fit intended users of different sizes and statures with minimal tooling and resources, within a short period of time and at reduced manufacturing costs.

Another feature of the present invention is to provide a light weight foldable and customizable wheelchair wherein there is provided a cross bracing structure which is light weight and novel in construction to provide easy connection and disconnection to side frames.

Another feature of the present invention is to provide a light weight foldable and customizable wheelchair wherein the front wheels are precisely adjustable in angle and in height, are very safe in construction, and can withstand impact and which can absorb shocks.

Another feature of the present invention is to provide a light weight foldable and customizable wheelchair wherein the rear wheels thereof are multi-adjustable, stiffer, less bulky and aesthetically pleasing to the eye.

Another feature of the present invention is to provide a light weight foldable and customizable wheelchair wherein the rear wheels are adjustably inclinable.

According to the above features, from a broad aspect, the present invention provides a light weight foldable and customizable wheelchair which is comprised of a tubular frame formed at least in part of molded polymer matrix composite material tubes and connectors. The wheelchair has two tubular side frame assemblies interconnected in side-by-side relationship by a pair of cross-brace members. The tubular side frame assemblies define a seating section therebetween. A rear wheel mounting bracket is secured to each of the side frame assemblies adjacent a rear end section thereof for securing a rear wheel to each of the side frame tubular assemblies at a desired selected position. A front wheel assembly is secured to a lowermost front end of each of the side frame tubular assemblies. The seating section is configurable along three axes. Each of the side frame tubular assemblies is adjustable in depth and in height, constituting a first and second of the three axes, by forming and cutting tubes of the side frame tubular assemblies to a desired length and gluing them to associated ones of the connectors. Each cross-brace member of the pair of cross-brace members, have a cross-brace connecting tube adjustable in length to provide a width adjustment which constitutes a third of the three axes of the side frame tubular assemblies. A pair of back canes is secured to the two side frame tubular assemblies and a seat and backrest support is secured respectively to the side frame tubular assemblies and the pair of back canes.

BRIEF DESCRIPTION OF THE DRAWINGS

A preferred embodiment of the present invention will now be described with reference to the accompanying drawings in which.

DESCRIPTION OF PREFERRED EMBODIMENTS

Figure 1:
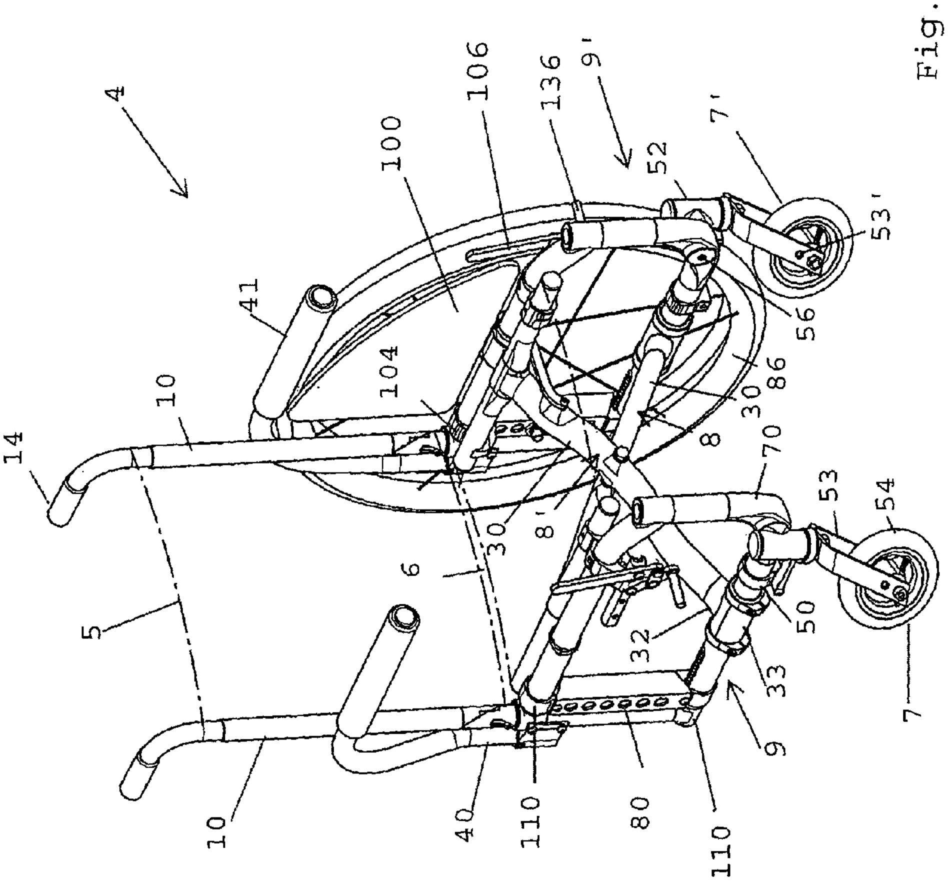
FIG. 1 is a perspective view of a wheelchair constructed in accordance with the present invention.

Referring to the drawings, FIG. 1 illustrates the construction of the light weight foldable and customizable wheelchair 4 of the present invention. The wheelchair comprises a tubular frame formed at least in a major part of molded polymer matrix composite material tubes and connectors as will be described later. The wheelchair has two side frame tubular assemblies 9 and 9' of identical construction and one of which will be described herein in detail. The wheelchair is one that is manually displaceable by the use of handles 14. The wheelchair is also a foldable wheelchair with the two side frame tubular assemblies 9 and 9' interconnected in side-by-side relationship by a pair of cross-brace members 8 and 8'. All of the tubular members are fabricated from polymer matrix composite material.

The two side frame tubular assemblies are provided with rear wheels 86, only one of which is herein illustrated, with each wheel being mounted to a mounting bracket 80 secured to each of the side frame assemblies 9 and 9' and adjacent a rear end section thereof. The mounting brackets 80 and 80' are better illustrated in FIGS. 2*a* and 2*b*. The wheels 86 are secured at a selected position to these mounting brackets 80 as will be described later. A front wheel assembly 7 and 7' is secured to each of the side frame tubular assemblies at a front lower end thereof. Although not all illustrated in FIG. 1, a plurality of accessories are secured to the tubular frame and these do not form part of the present invention. For example, a seating section is defined over the pair of side frame tubular assemblies 9 and 9' as schematically illustrated at 6, a back rest support of canvas or padded fabric is interconnected between the canes 10 and 10' to form a backrest 5 for a user person, and a clothes guard 100 to protect the user's clothes is connected to one of the pair of side frame tubular assemblies 9'.

The seating section 6 is configurable along three axes whereby to adjust the width, the depth and the height of the seating section.

With reference to FIGS. 2*a* to 4*f*, there will be described the construction of the side frame tubular assemblies 9 (or 9') as well as the cross-brace members 8 and (8').

Figure 3:
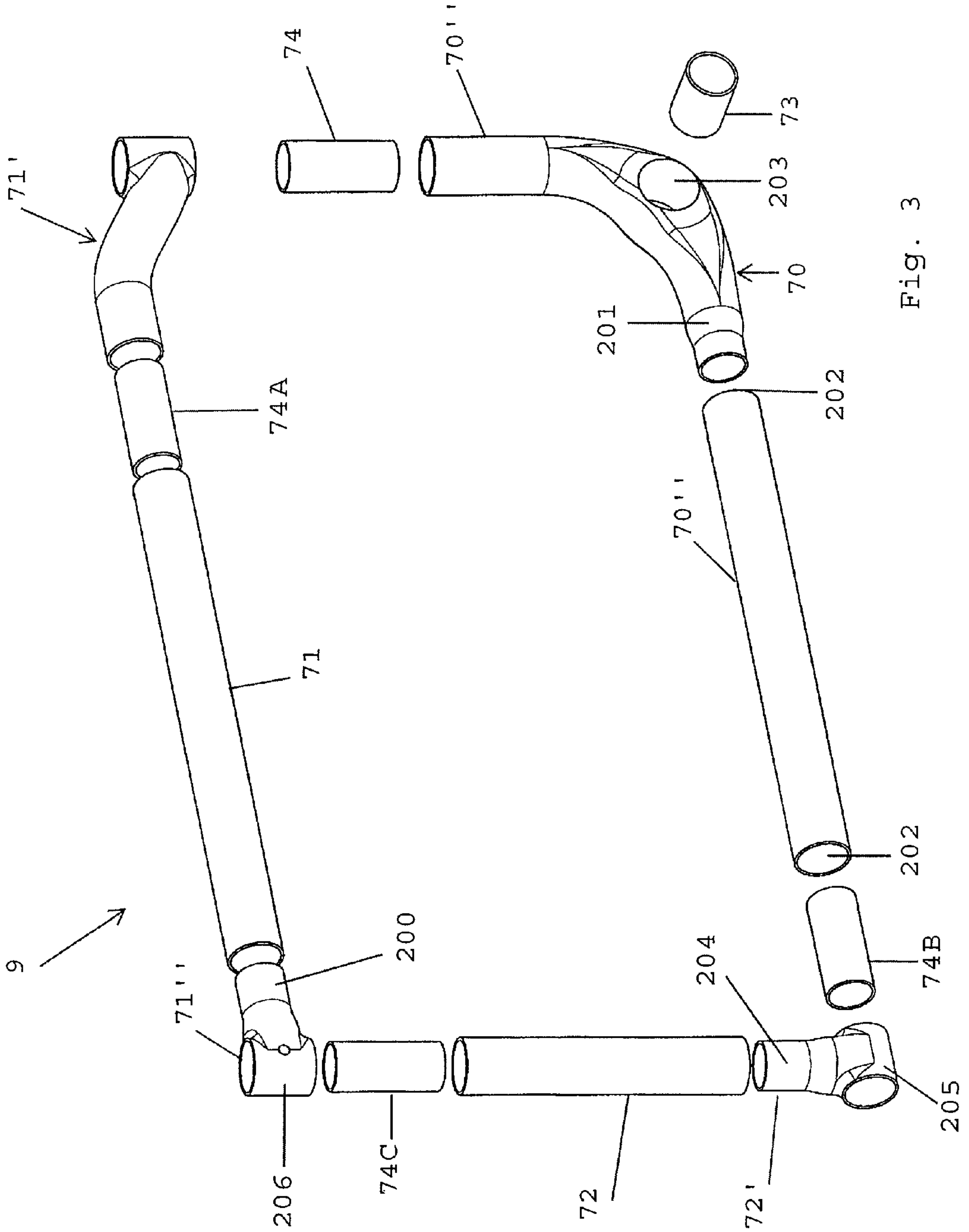
FIG. 3 is an exploded perspective view of the side frame of the wheelchair of FIG. 1.

With reference specifically to FIG. 3, it can be shown that the side frame tubular assembly, 9 or 9' is a rectangular tubular side frame assembly comprised of a first straight upper tubular member 71 molded and cut to a desired length. Transverse connectors 71' and 71" (also referred to herein as lugs) are molded to fit with tubular member 71. Transverse connector 71" connects with tubular member 71 by partly being inserted within tubular member 71 via a tapered connection end 200 thereof, while transverse connector 71' connects to member 71 via a separate lap joint tube 74. The lap joint tube 74A has a diameter slightly less than the inner diameter of tubular member 71 and connector 71' so as to be snugly fit into each of these and provide for an inner interconnection there between when glued. Each of tubular member 71, connectors 71' and 71" as well as lap joint tube 74A, is initially formed in a mold which is a modular adjustable mold. The tubular member 71 can be made or cut to different lengths. A second molded right-angled tubular connecting member 70 (also generally referred to as a lug) is molded as a unitary part. Tubular connecting member 70 has a front vertical tubular arm 70' at one end, and connects at another transverse end via a tapered connection 201 to one of two opposite free ends 202 of a transverse horizontal tubular member 70". The right-angled tubular connecting member 70 is provided with an attachment hole 203 to receive a molded head tube sleeve 73 which is glued therein to connect a wheel assembly thereto. Alternatively, this molded head tube sleeve 73 can be integrally formed with the member 70. The front vertical tubular arm 70' can be cut to a desired length to adjust the height of the seating section 6. The transverse horizontal tubular member 70", and the tubular member 71 each being free of any connecting part at each of their own two opposite free ends can also each be cut to any desired length to adjust the depth of the seating section 6.

The rectangular tubular side frame 9 is further provided with a third molded rear vertical tubular member 72 which also has two opposite free ends. The free ends are free from any connecting part permitting the length of the member 72 to be cut to a desired length to provide for a seating height adjustment. A separate transverse connector 72' is provided with a tapered section 204 to connect at lower free end of the tubular member 72. A lap joint tube 74B is secured to the free end 202 at one end and to a connecting sleeve 205 at a lower end of the connector 72' by glue. Another lap joint tube 74C is glued in the top end of the member 72, at one end, and in the connecting sleeve 206, at the other end. Again all of these arms, tubular members and connectors are molded from a polymer matrix composite material.

Figure 4A:
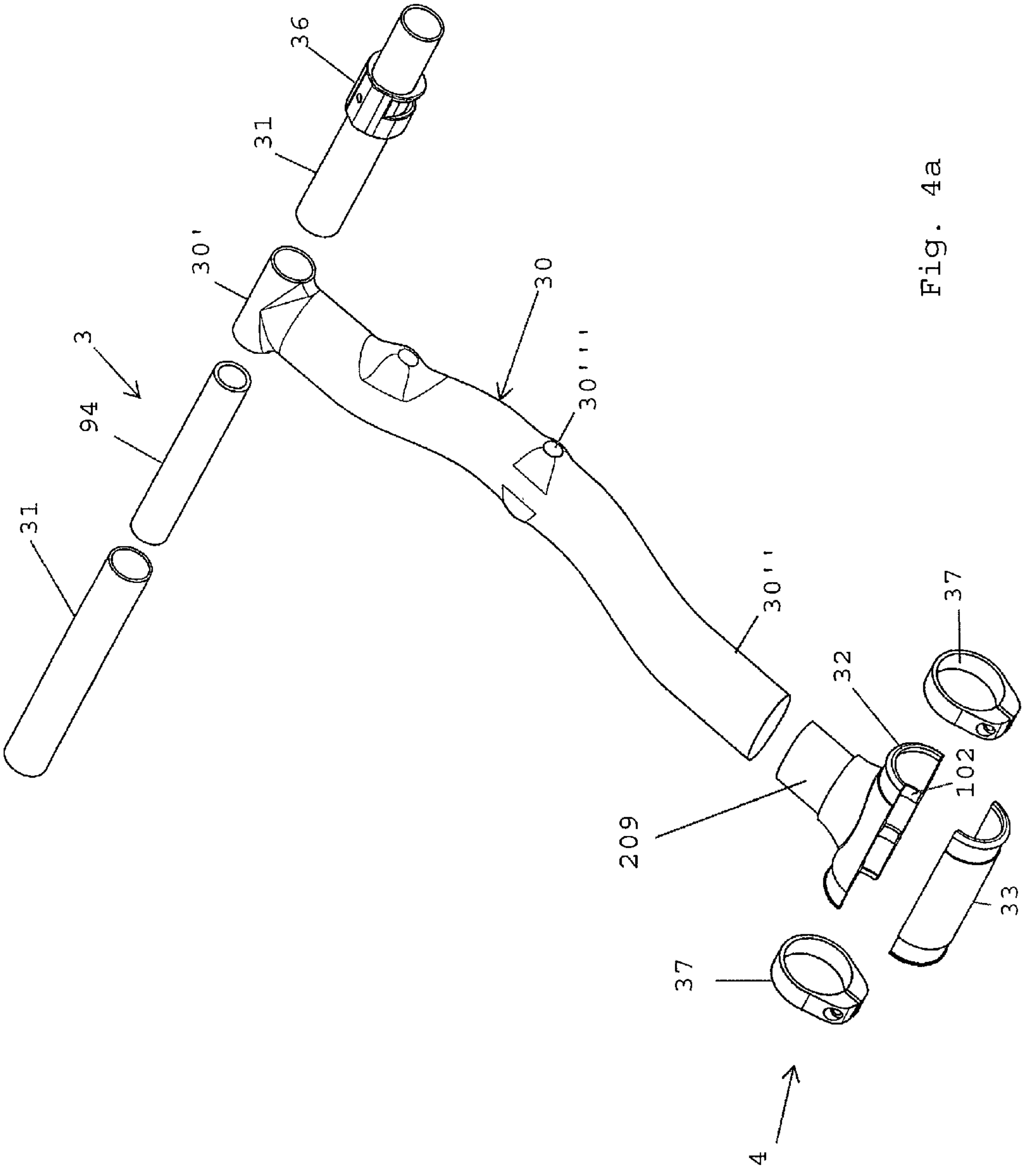
FIG. 4*a* is an exploded perspective view of a cross-brace of the wheelchair of FIG. 1.
Figure 4B:
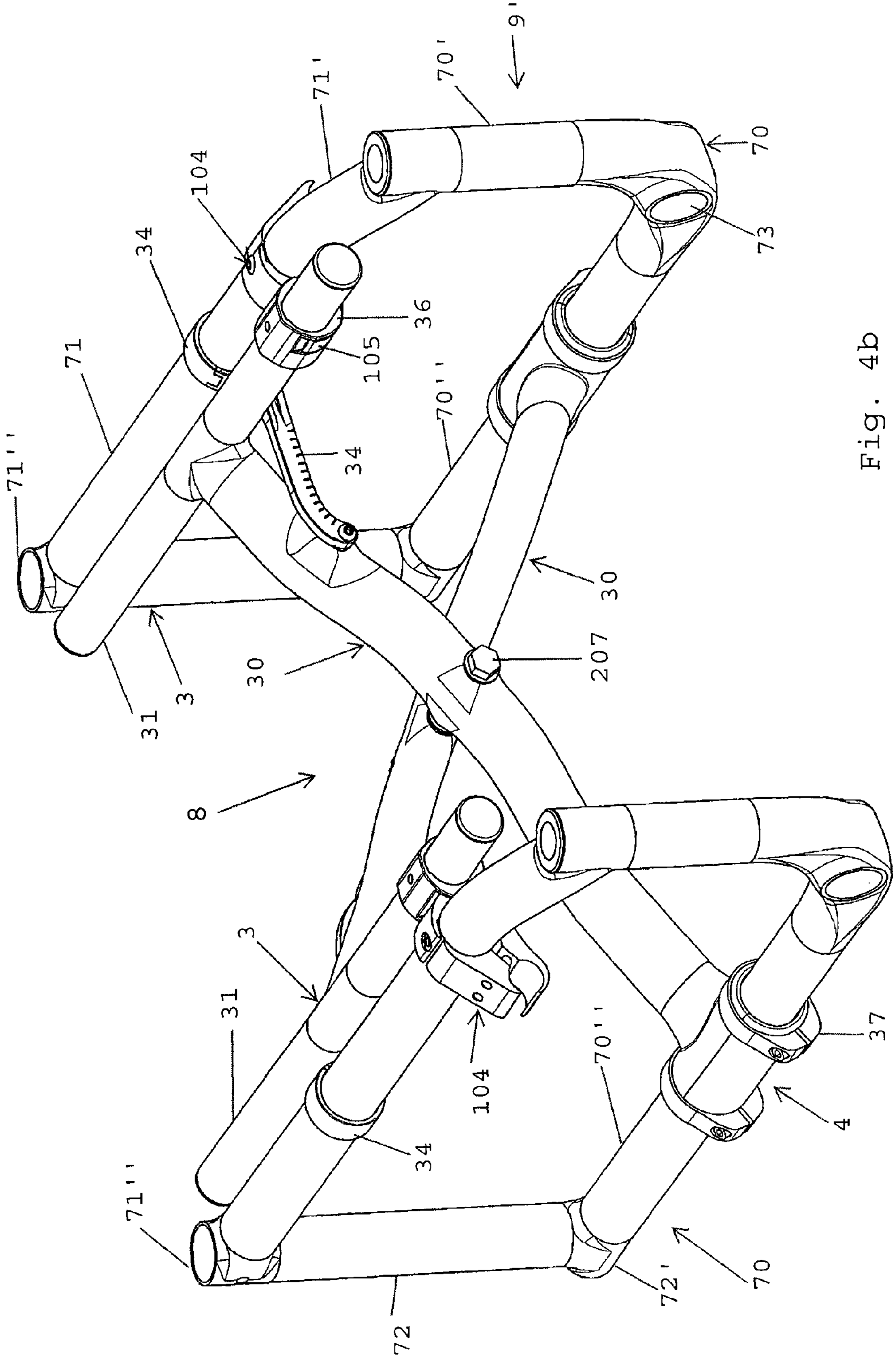
FIG. 4*b* is a perspective view of the folding mechanism of FIG. 2*a* with the cross-braces of FIG. 4*a;*
Figure 4C:
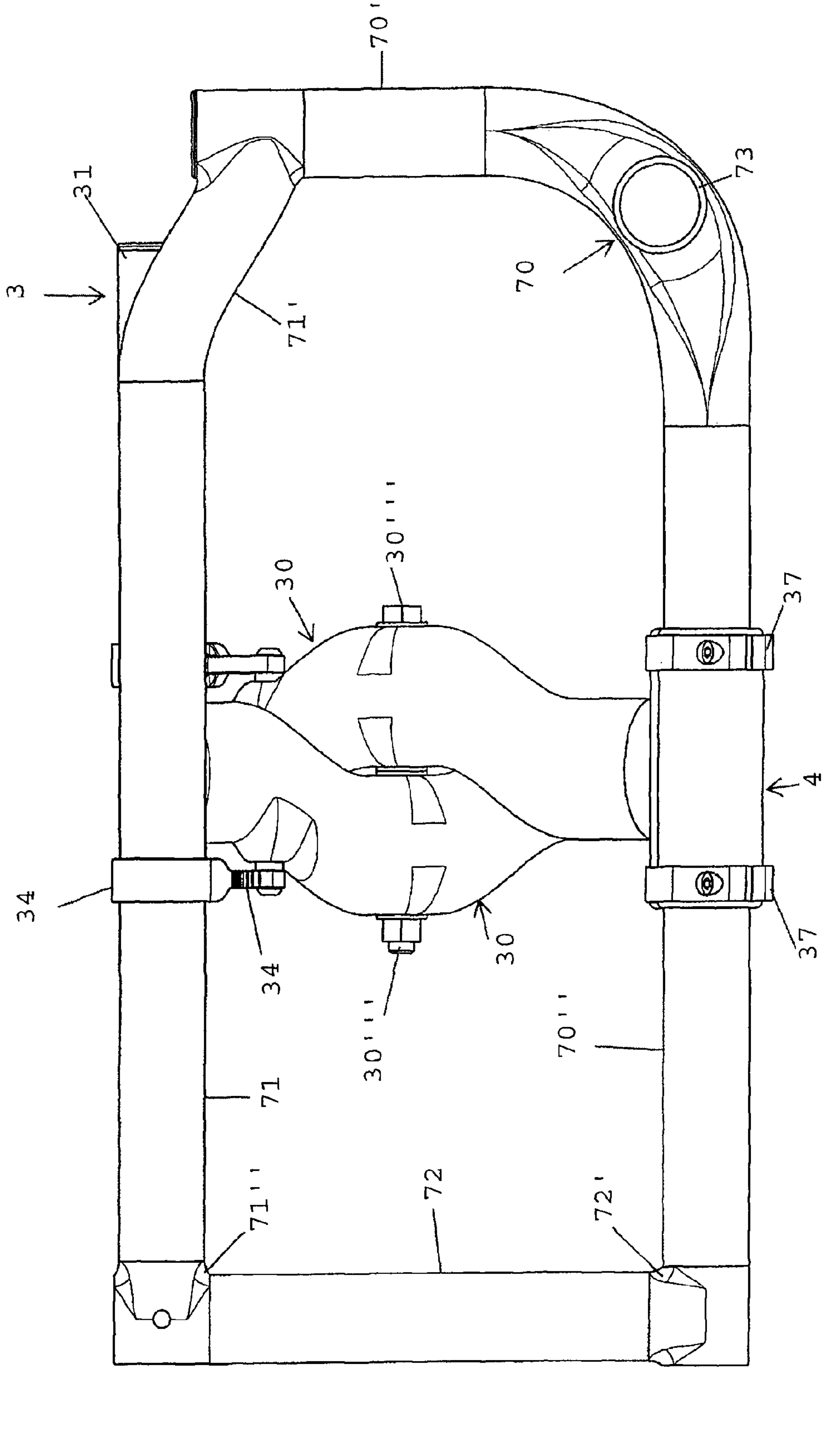
FIG. 4*c* is a side elevation view of the folding mechanism of FIG. 4*b;*
Figure 4D:
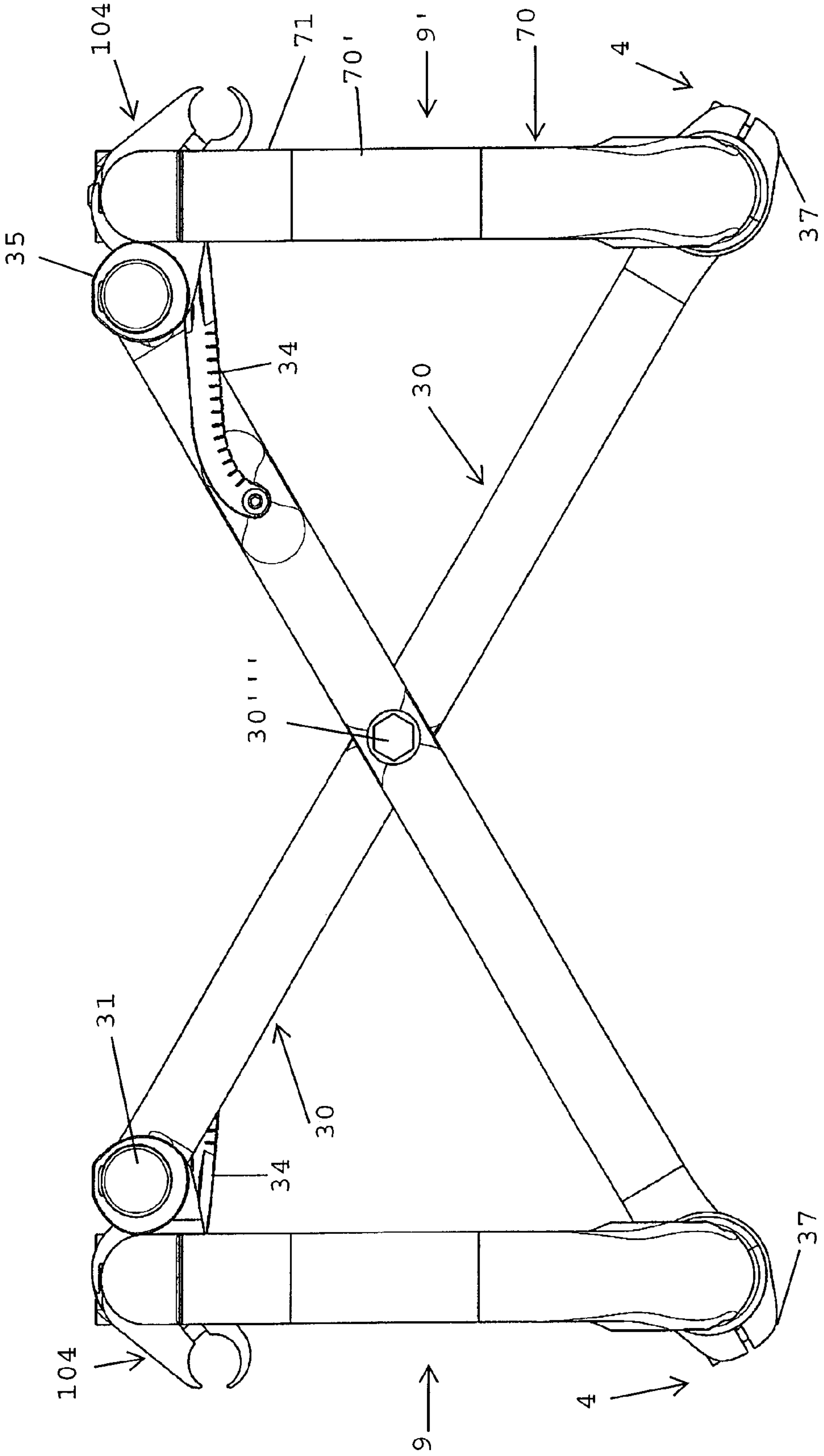
FIG. 4*d* is a front elevation view of the folding mechanism of FIG. 4*b;*
Figure 4E:
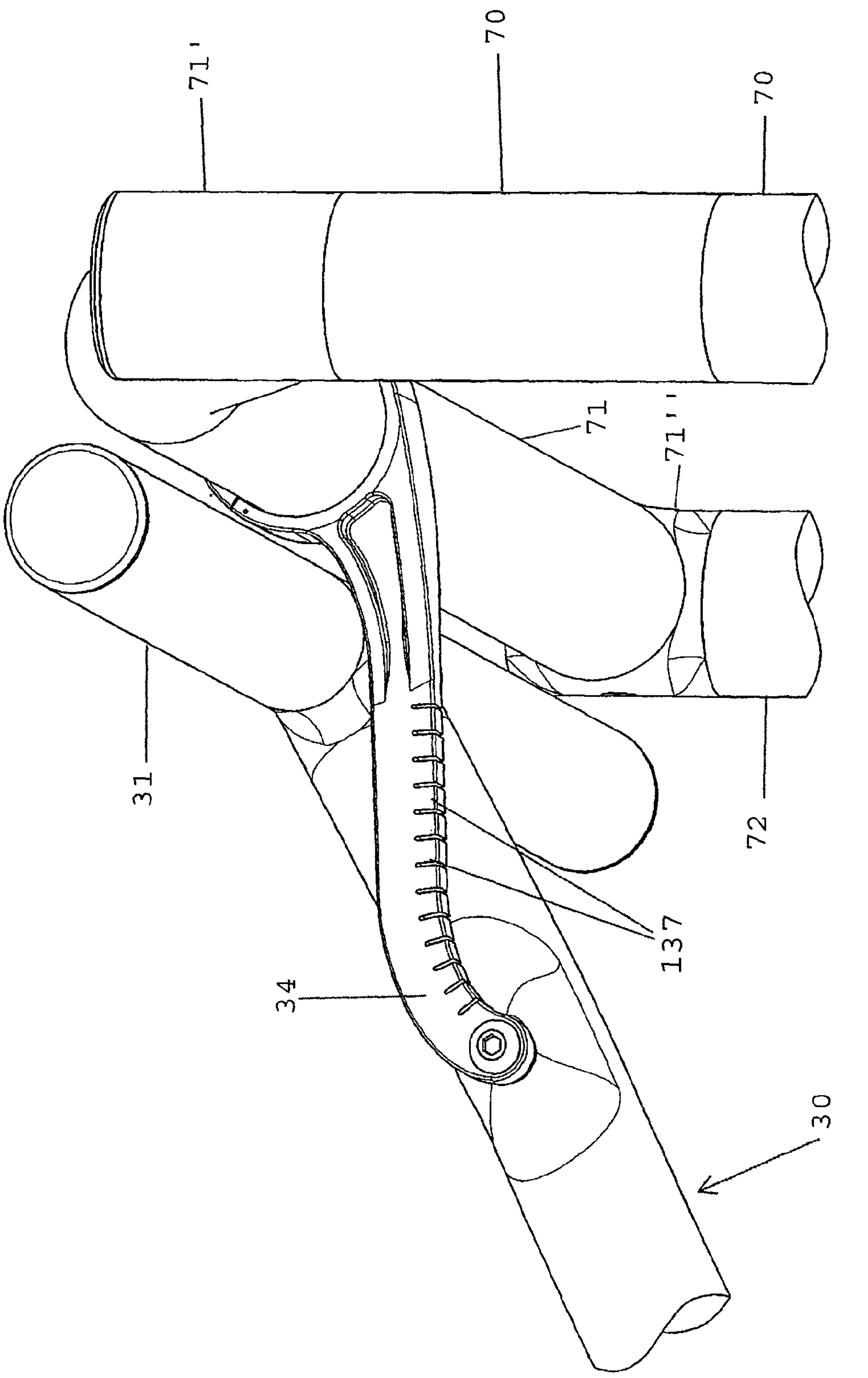
FIG. 4*e* is a perspective close up view, partly fragmented, of a link rod of the wheelchair of FIG. 1, in a position of use.

With reference now specifically to FIGS. 2*a*, 2*b* and 4*a* to 4*d*, the construction of the cross-brace connecting tubes 30 will now be described. Each cross-brace connecting tube 30 is provided with a connecting clamp 4 at a lower end thereof for pivotal connection to the horizontal tubular member 70" of one of the rectangular tubular side frames 9 or 9', as shown in FIG. 1. A clamping member 3, in the form of a seat cross-brace tube 31, is provided at an upper end of the cross-brace tube 30 for removable connection with the first straight upper tubular member 71 of one of the rectangular tubular side frames 9 or 9', as shown in FIG. 4*b*, which is opposite from the side frame to which the clamp 4 is connected.

Figure 2A:
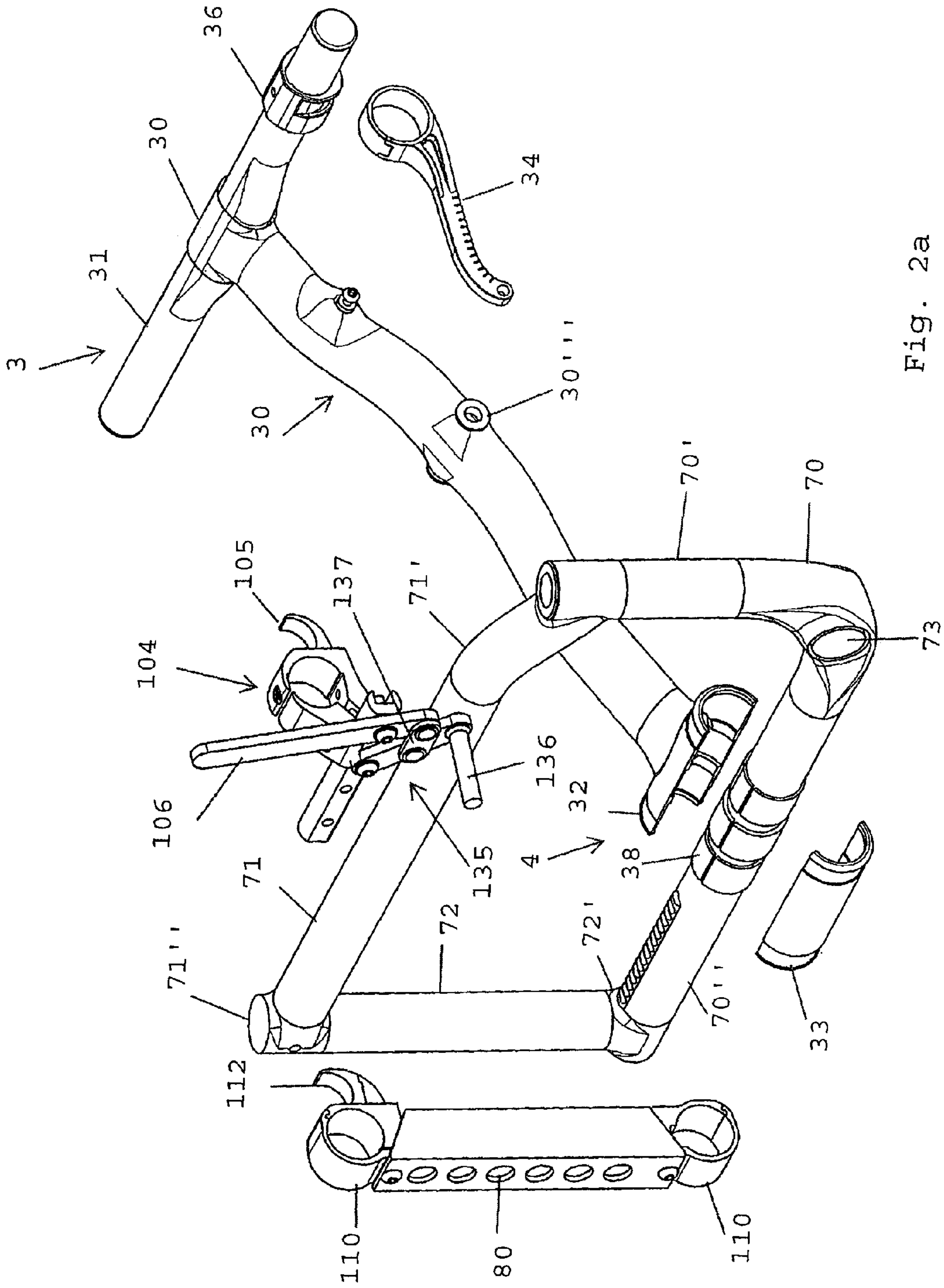
FIG. 2*a* is an exploded perspective view showing the folding mechanism of the wheelchair of FIG. 1.
Figure 2B:
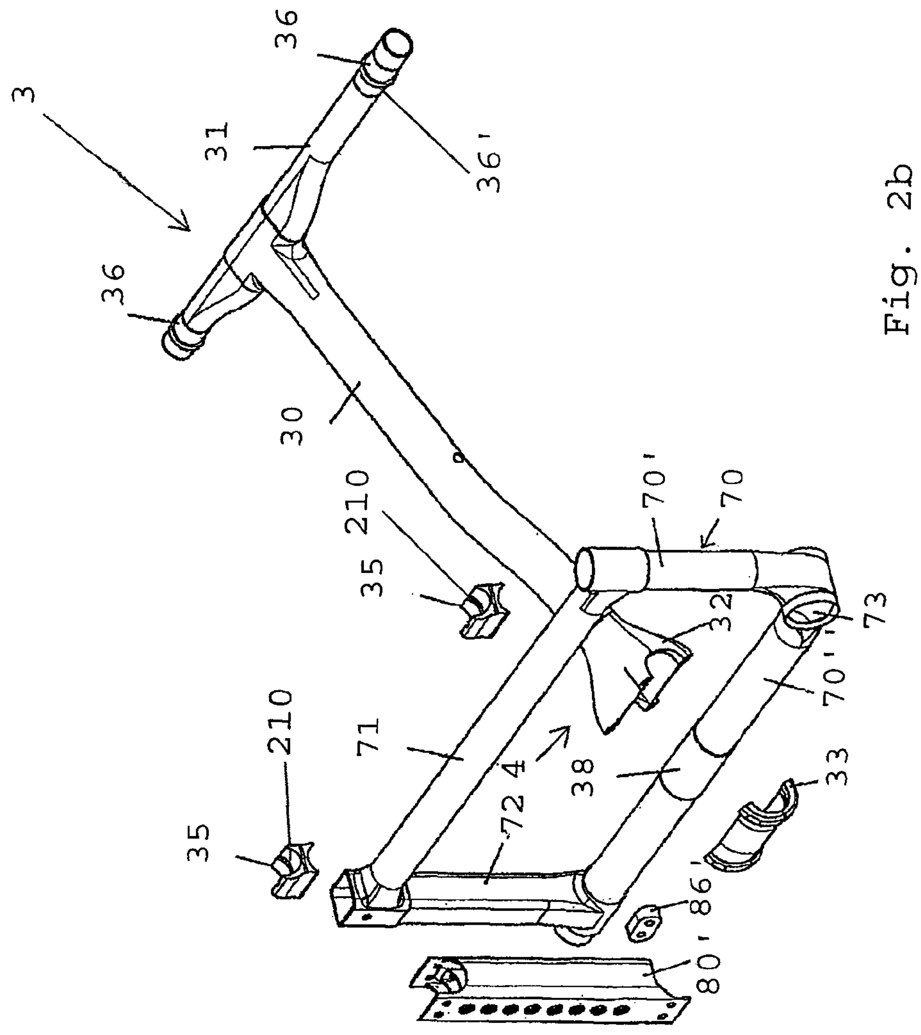
FIG. 2*b* is a perspective exploded view showing another one of possible embodiments for the folding mechanism of the wheelchair.

In reference to FIGS. 2*a*, 2*b* and 4*a*, the cross brace connecting tube 30 has an end connecting sleeve 30' which is integrally molded from polymer matrix composite material. The length of the cross-brace connecting tube 30 is adjusted by cutting its free lower end portion 30". After the cross-braces have been cut to the desired length, a hole 30'" is drilled centrally of the cross-braces whereby they are pivotally interconnected together by a pivot pin or a pivot connection tube 207, as shown in FIG. 4*b*, at mid-length thereof to cause the rectangular tubular side frames 9 and 9' to be folded one adjacent the other, whereby the wheel chair can be collapsed.

The cross-brace tubular assemblies 8 and 8' provide a folding mechanism as well as a strong inter-connecting mechanism between the side frame tubular assemblies 9 and 9'. The connecting clamp 4 connects the lower end of the cross-braces 30 to the tubular member 70" of the side frames substantially centrally thereof, as shown in FIG. 1. The connecting clamp 4 is a metal clamp having a clamp jaw 32 and connecting polymer tube 209 to be secured in the free end 30" of the cross-brace 30 in close fit therein. The clamp jaw 32 is held in position by a sleeve 38 (see FIG. 2*a*) which is glued onto the horizontal tubular member 70' substantially centrally thereof. A cross-brace clamp flange 33 is connected to the jaw 32 by two clamps 37 as illustrated in FIG. 4*a*. The sleeve 38 is optionally a guide sleeve having two plastic bearings which are made to be fit into respective inner grooves 102 of the clamp jaw 32 and the clamp flange 33. The connecting clamp 4 is dimensioned whereby to be pivotally connected about the tubular member 70". The opposed end of the cross-brace arm 30 is adapted to receive a seat cross-brace tube 31 in its connecting sleeve 30' and immovably secured therein by glue. This seat cross-brace 31 tube is also constructed of light weight polymer matrix composite material, and as illustrated in FIG. 4*a*, is constructed from the engagement of separate tubular members 31 and a lap joint tubular section 94 which fits within the opposed ends of the member 31 to adjust its overall length as desired.

As illustrated in the embodiment of FIG. 2*b*, the free ends of the cross-brace tube 31 are fitted with H-block guide sleeves 36 which are glued thereto. These guide sleeves 36 are configured whereby to be received in H-block connectors 35 and which are immovably secured by glue or other means to the straight upper tubular member 71 of each rectangular tubular side frame 9 and 9'. Accordingly, the ends of the cross-brace tube 31 can be connected to the rectangular tubular side frames by releasable clamping engagement with the H-block guide sleeve 36 into respective H-block connectors 35.

Figure 2C:
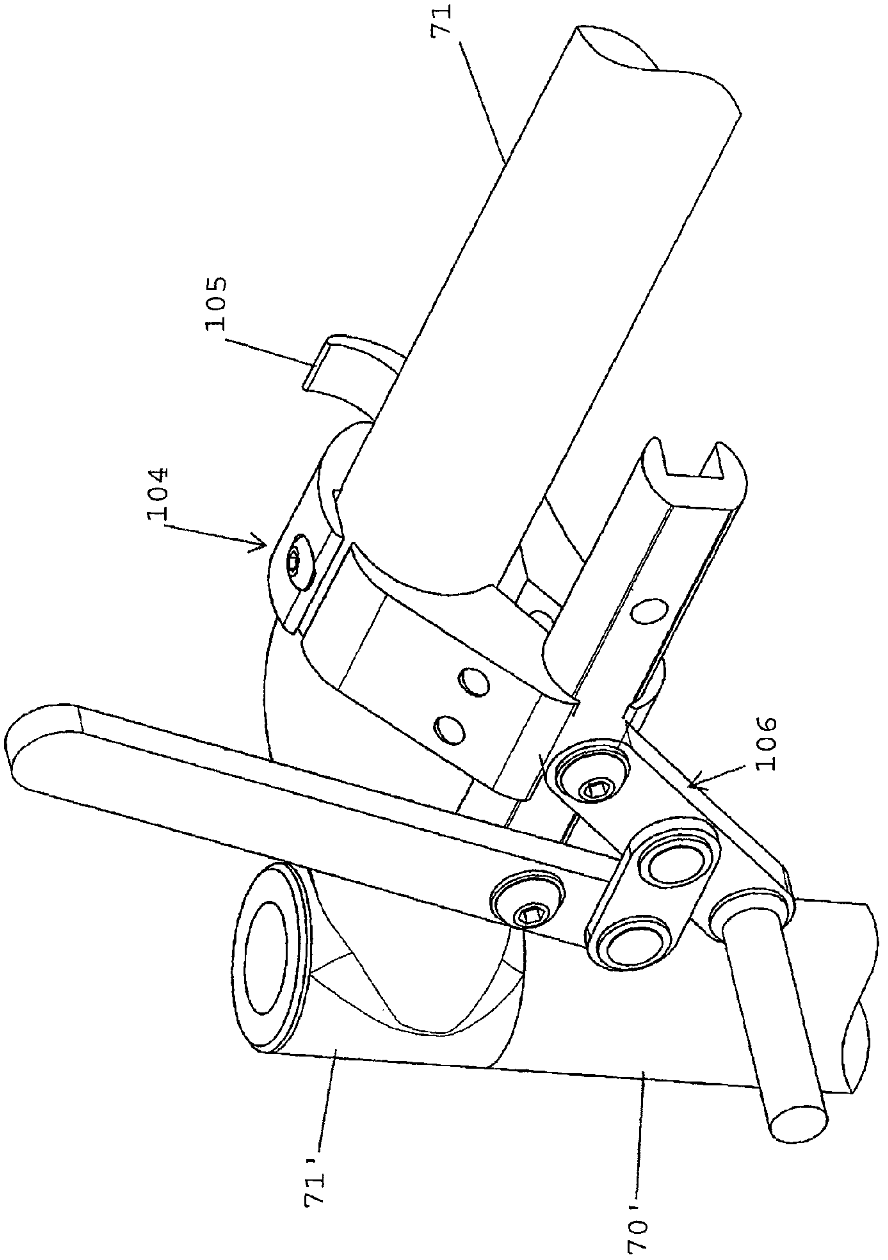
FIG. 2*c* is a perspective, partly fragmented, view showing the clamp and the brake mechanism of FIG. 2*a;*

Alternatively to the above, and referring to FIGS. 2*a*, 2*c*, 4*a* to 4*c* and 4*f*, the front end of the seat cross-brace tube 31 is fitted with an H-block guide sleeve 36 which is configured to be received in a clamp 104. The clamp 104, which is better illustrated in FIG. 2*c* or 4*b*, provides a locking fit with the H-block guide sleeve 36. The clamp 104 is also immovably secured by glue or other means to the straight upper tubular member 71 of each rectangular tubular side frame 9 and 9', as better seen in FIG. 1. Accordingly, the front end of the cross-brace tube 30 is connected to the rectangular tubular side frames by releasable clamping engagement with the sleeve 36 into a hook flange 105 formed with clamp 104 and in snug fit engagement therewith. The clamp 104 is also adapted to hold the wheel lock rail or braking device 106 as seen in FIG. 2*c*.

As illustrated in 2*a*, 4*b*, 4*d* and 4*e*, a flexible link rod 34 made of resiliently flexible material, such as polymer matrix composite material, is pivotally connected at one end to the first straight upper tubular member 71 of the rectangular tubular side frame 9', and at an opposed end to the cross-brace connecting tube 30.

The flexible link rod 34 is provided with each of the cross-braces 30 to maintain a flexible connection with the side frames 9 and 9' throughout the disengaging of the cross-brace tubes 31 upon providing a lifting motion to disconnect the cross braces 30 from the H-blocks 35 or the clamp 104 and permit the side frames 9 and 9' to be folded one adjacent the other.

Figure 4F:
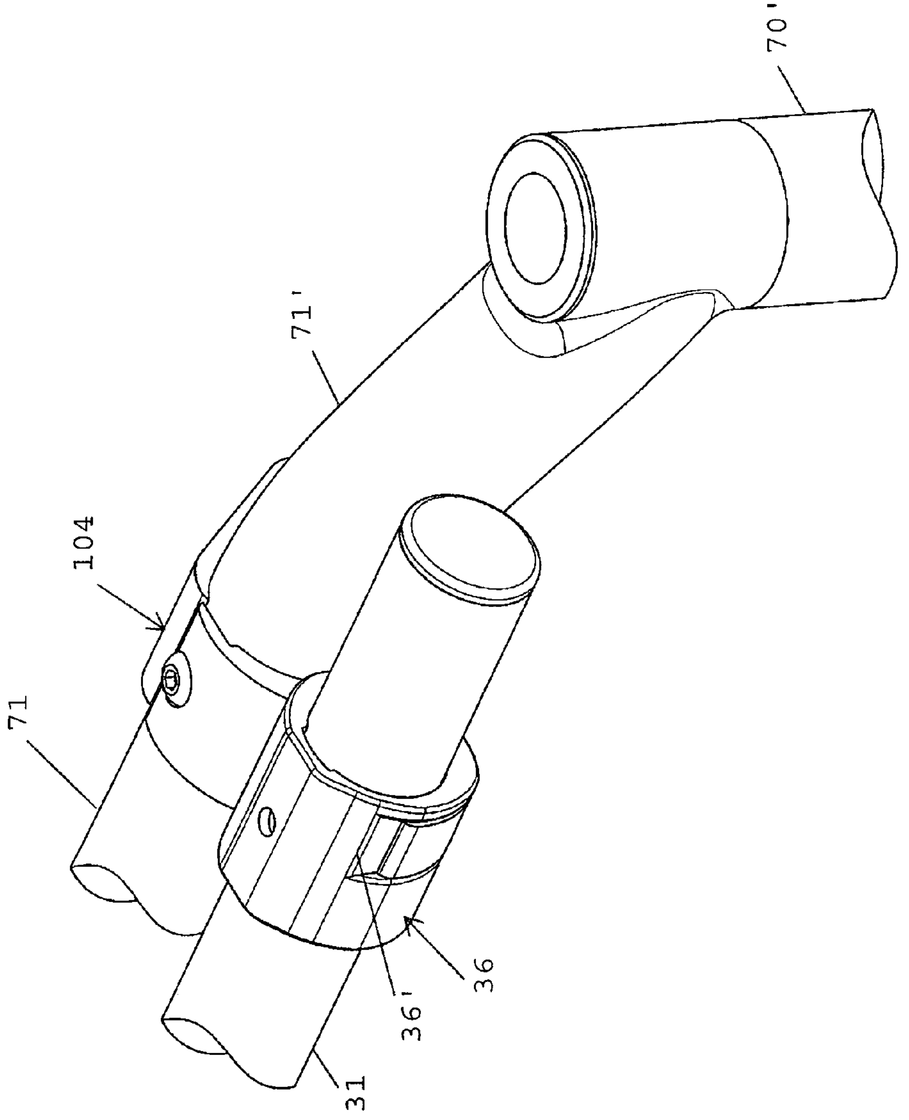
FIG. 4*f* is a perspective close up view, partly fragmented, of a clamp of the wheelchair of FIG. 1, in an unfolded arrangement.

As better seen in FIG. 2*b*, the sleeves 36 are provided with a circumferential ridge 36' that engage snugly in channels 210 provided in the H-blocks 35 and this prevents translationary displacement of the seat cross-brace tubes 31 with the side frames thereby providing for a rigid interconnected frame. Alternatively, as shown in FIG. 4*f*, a similar prevention of translationary displacement of the cross-brace tubes 31 with the side frames 9 or 9' is also provided by the sleeves 36 having a circumferential slot 36' wherein the clamp 104 is snugly engage the tube so as to create an iso-lock mechanism. The iso-lock mechanism is meant to enhance the frame's integrity and rigidity.

The above-mentioned flexible link rod 34 provides for a flexible support which limits the outward angular movement of the side frames 9 and 9' when being folded one adjacent the other. The flexibility of the link connector or rod 34 also eases the folding and unfolding of the frame. Unlike in the traditional folding mechanism of prior art wheelchairs wherein a geometrical interference is provided between the back canes and the link rods, as the wheelchair is being folded into a mid-closed position, the back canes are spread apart without creating a tension in the back upholstery forming the backrest 5. In the present wheelchair, the tension as seen with the prior art is released due to the presence of the flexible link connector 34 which compresses until the cross-braces 30 are folded together and the wheelchair is in a collapsed and folded position. The flexible link connector 34 is formed from a one piece plastic material which is able to flex to open and clamp around the respective side frames 9 or 9' of the wheelchair. Slots 137 in the bottom edge of the link connector 34 provides for the flexion. The shape of the link rod 34 also permits the cross-brace tube 31 to lie in the plane of the upper tubular member 71 of the side frames.

Figure 7A:
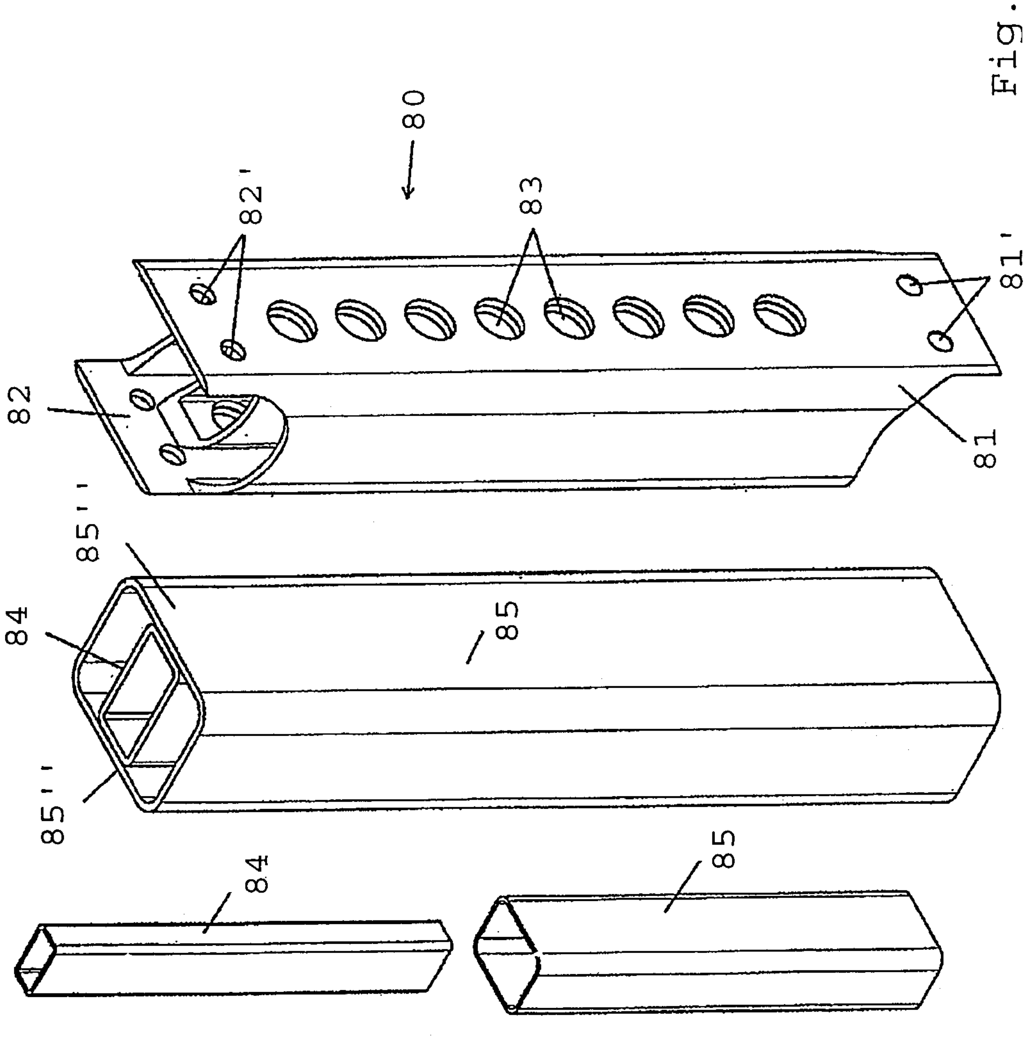
FIG. 7*a* is an exploded perspective view of one of possible embodiments for a rear wheel mounting bracket of the wheelchair of FIG. 1.

Referring now to FIG. 7*a*, there is shown the rear wheel mounting post 80 and its construction. The mounting post 80 is fabricated from polymer matrix composite tubular material or from aluminum extrusion, and as herein shown, is of substantially rectangular cross section. It is formed from a straight tube 85 which is reinforced by and inner straight tube 84 also of rectangular cross section. The inner tube 84 is glued within the outer tube 85. The tube 85 defines opposed flat side walls 85". A plurality of axle receiving holes 83 are drilled along a straight vertical axis of the opposed flat side walls 85' with the holes 83 of each side wall 85' being aligned with one another whereby to receive an axle in support engagement therewith.

The rear wheel brace mounting post 80 is further provided with securing brackets 81 and 82 integrally formed at opposed ends thereof. The upper securing bracket and lower securing bracket are machined in the outer ends of the tubular members. These brackets 81 and 82 provide for securement of the mounting bracket between the first straight upper tubular member 71 and the horizontal tubular arm 70' of each rectangular tubular side frame 9 and 9', as illustrated in FIG. 2*b*. The brackets 81 and 82 also permit for the positioning of the bracket 80 at any desired location in the rear portion of the rectangular tubular side frames 9 and 9' to customize it to the intended user. As herein shown, the upper securing bracket 82 is formed by opposed wall sections and is of substantially U-shape configuration and is provided with holes 82' to receive fasteners therein. The lower securing bracket 81 is formed as a single outer flange and is also provided with holes 81' to receive fasteners for securing same to the rectangular tubular side frame.

Figure 7B:
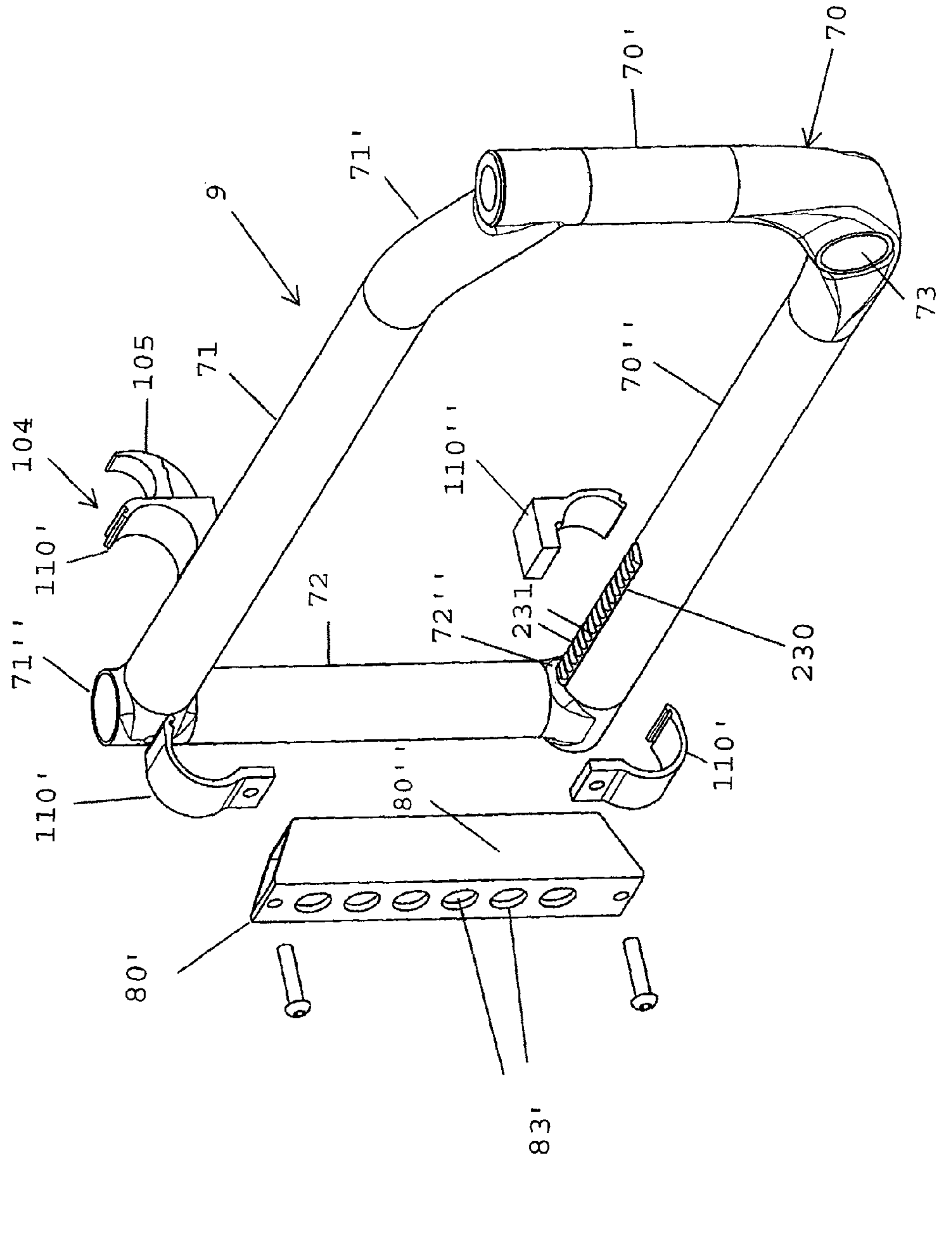
FIG. 7*b* is a perspective view of another one of possible embodiments for the rear wheel mounting bracket of the wheelchair of FIG. 1, using universal clamps.

Alternatively, as illustrated in FIG. 7*b*, the mounting post 80 does not have securing brackets and is machined with slanted outer ends for securement to a universal clamp 110. The universal clamp 110 in turn secures the bracket 80 to the side frame 9 or 9'. The universal clamp 110 is described later.

Referring to FIG. 2*b*, in order to provide a camber for the rear wheels 86, there is provided a camber washer 86' that may be secured inside the flange wall 81 at the lower end of the mounting post 80 whereby to tilt the wheel mounting post 80 outward at its lower end whereby the wheel will be slanted outwardly in its lower portion. In the alternative example illustrated at FIGS. 2*a* and 7*b*, camber of the rear wheels is provided by the post 80' having axle mounting holes 83' drilled at an angle and fitted with correspondingly tapered washers (not shown). The post 80' has opposed lower edges of its sidewalls 80" immovably retained in the slots 231 of a ribbed member 230 secured to the top edge of the tubular member 70", a shown in FIG. 7*b*.

Figure 5:
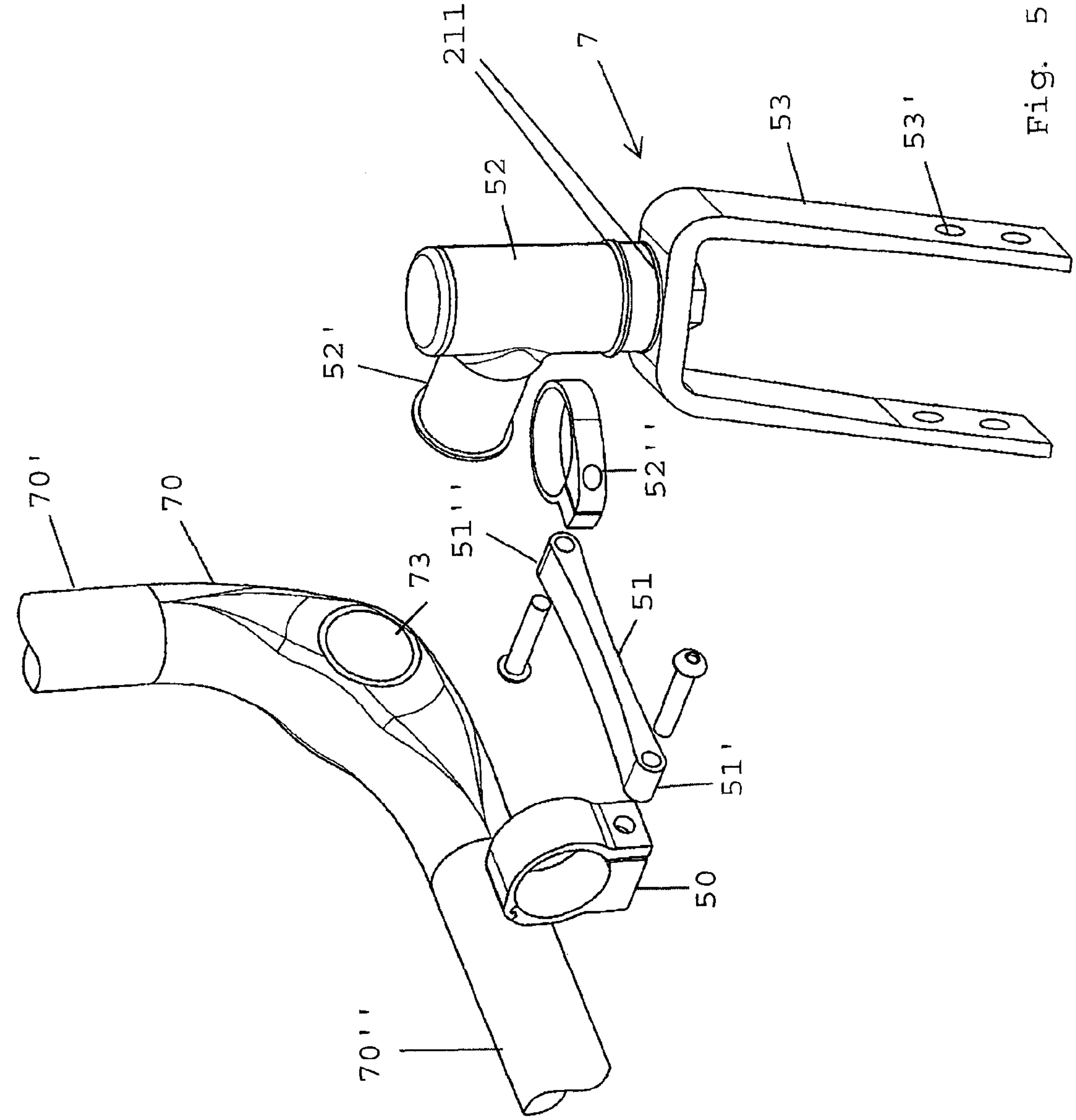
FIG. 5 is an exploded perspective view, partly fragmented, of a front fork and hardware of the wheelchair of FIG. 1.

Referring back to FIG. 5, there is shown the construction of the front wheel assemblies 7 and 7'. As herein shown the head tube 52, to which the caster bracket 53 is adjustably secured, is provided with a connecting tube 52' which is received in the hollow tubular connector 73 of the second tubular connecting member 70. The tubular connector 52' has an inward thread and it is held in position within the connector 73 by a screw (not shown) through a cap 56 (as shown in FIG. 1) from the opposed side of the hollow connector 73. The head tube 52 is provided with two roller bearings 211 whereby to permit free rotation of the fork 53. The fork 53 is provided with two or more holes 53' whereby to permit vertical adjustment of the caster 54. A guide rod 51 is provided whereby to adjust the height of the fork 53 with respect to the head tube 52, or the axis of rotation of the fork 53. The rod 51 accordingly adjusts the angle of the head tube 52. The rod is secured to the horizontal tubular member 70" by a clamp 50 which is secured to the free end 51' of the rod 51. The other end 51" is secured to a connecting clip 52" clamped to the head tube 52. The head tube 52 is an aluminum tube. The clamp 50, the rod 51 and the head tube 52 form a triangular system which permits precise adjustment of the axis of rotation of the fork 53. The adjustment is provided by sliding the clamp 50 and securing the clamp when the head tube 52 is at a desired angle. A universal clamp 110 can be used in place of clamp 50, as later described.

Figure 6:
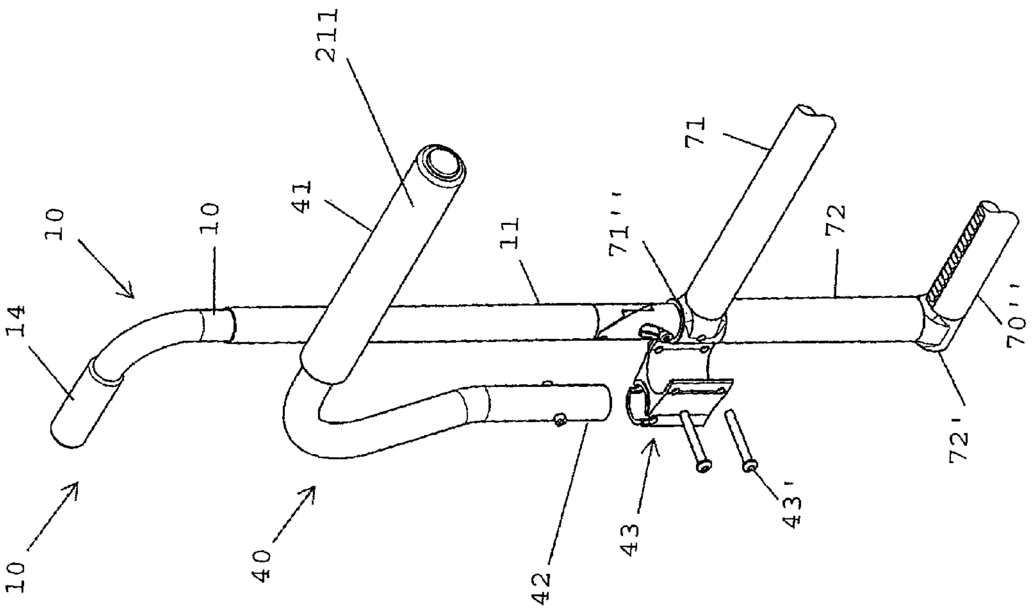
FIG. 6 is an exploded perspective view, partly fragmented, of an arrangement of for securing the arms of the wheelchair of FIG. 1.

With reference now to FIGS. 1 and 6, there will be described the construction of the L-shaped armrest 40 which is also molded from polymer matrix composite material. The armrest has a hollow arm connector 42. The hollow arm connector 42 is secured in a bracket 43 which secures on an opposed side of the rear one of the transverse connectors, herein connector 71", using screws or bolts 43'. The arm support position 41 has a rubber or foam sleeve 211 secured thereover.

Figure 8A:
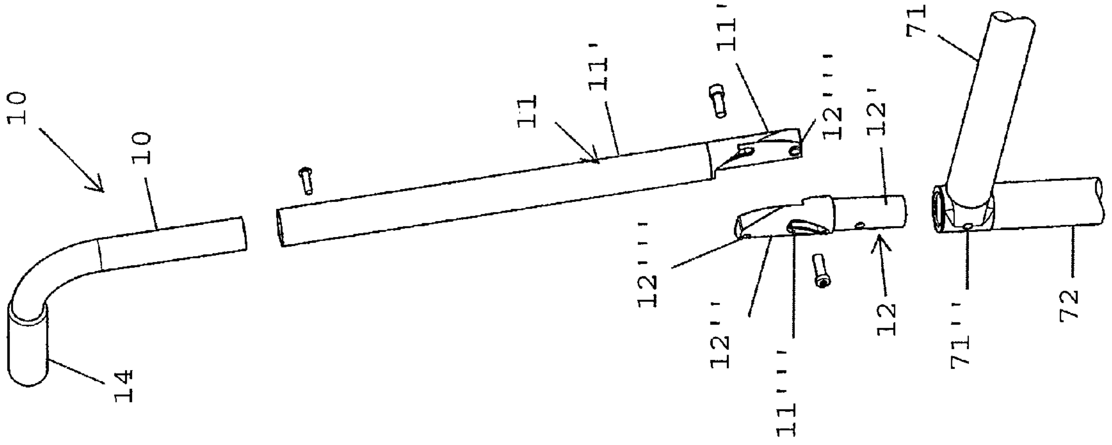
FIG. 8*a* is a perspective exploded view of one of possible arrangements for back canes of the wheelchair of FIG. 1.
Figure 8B:
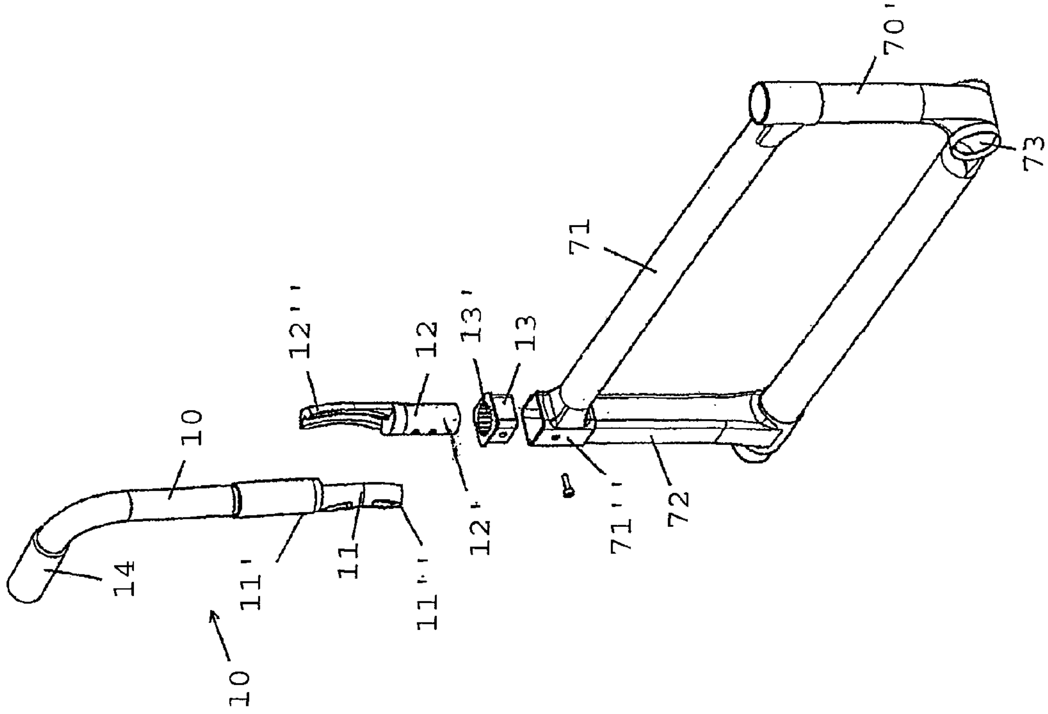
FIG. 8*b* is a perspective exploded view of another of possible arrangements for the back canes of FIG. 8*a;*

Referring now to FIGS. 1, 8*a*, 8*b*, 8*c* and 9-11 there will be described the construction of the back canes 10 and 10'. The back canes are also molded from polymer matrix composite material with sections thereof being glued together. The back canes are also provided with a handle 14. As herein shown the back canes are angularly adjustable back canes which are comprised of a straight vertical tube section 10 provided with a lower curved flange connector formation 11. The vertical tube section 10 can be adjusted in height as it is adjustably inserted into connecting member 11' and secured therein by a pin as illustrated in FIG. 8*b*. A cane support insert 12 is secured in an open top end of the transverse connector 71". A square coupler 13 of square cross section provides an adapter to fit the tubular insert 12 into the open end of a square connector 71". Alternatively, with the sleeve connector 71" of FIG. 3 there is no need for a coupler 13. If the coupler 13 is used, the top end of the coupler 13 is provided with a circular cavity 13' to receive the connecting base 12' of the cane support insert 12. The cane support insert 12 of FIG. 8*b* is better illustrated in FIG. 11 and it has a curved connecting end formation 12" for facial arresting coupling with the curved flange 11, which is better illustrated in FIG. 10 whereby to connect the cane at a desired rearwardly inclined angle. Fasteners (not shown) extend between the holes 12'" in the cane support insert 12 and selected ones of the hole formations 11'" formed in the curved flange connector formation 11. Accordingly, the proper tilt angle of the canes 10 and 10' can be set with a slight elevation thereof resulting from the coupling between the flange connector formation and the cane support insert.

Figure 10:
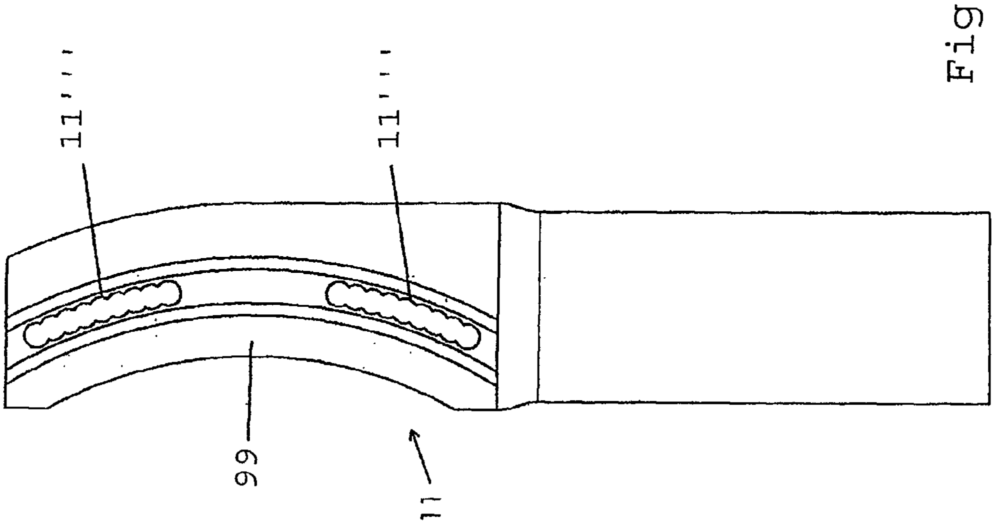
FIG. 10 is a side view illustrating the shape of the lower curve flange connector of the canes of FIG. 8*b;*
Figure 11:
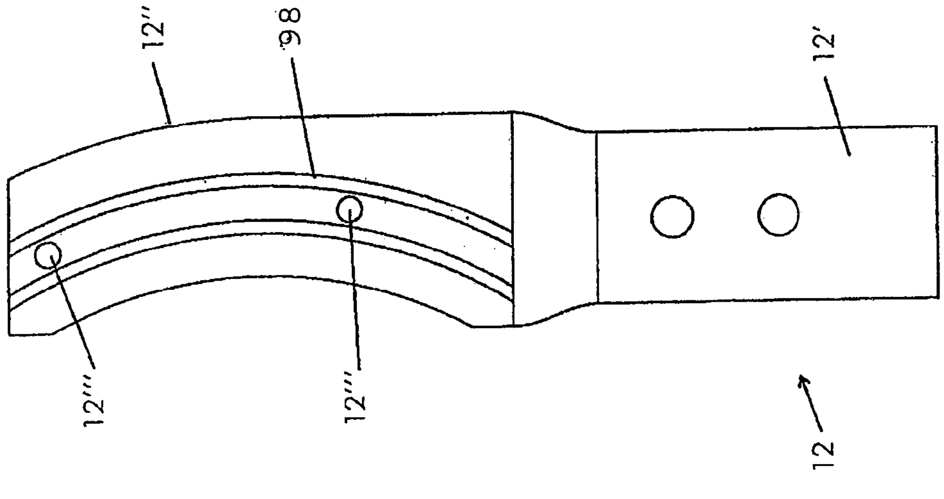
FIG. 11 is a side view illustrating the shape of the cane support insert with its curve connecting end formation of FIG. 8*b;*

As better shown in FIG. 11 the support insert 12 is also provided with an arcuate projection 98 which fits in an arcuate groove 99 of the curved flange connector formation 11 as shown in FIG. 10. Accordingly, there is provided a rigid connection between these elements when secured together at a desired position by fastening bolts (not shown). The inclination of these canes also provides for the adjustment of the backrest 5 of the wheelchair.

Figure 9:
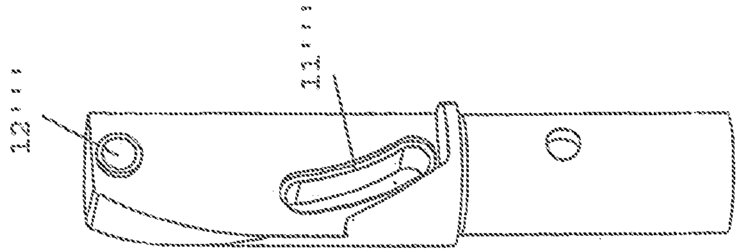
FIG. 9 is a side perspective view illustrating the shape of a lower curve flange connector of the back canes of FIG. 8*a;*

Alternatively to the above, and as illustrated in FIGS. 8*a* and 9, the cane support insert 12 and the curved flange 11 each consist of two identical parts as illustrated in FIG. 9, one of which is inserted into the connector 71" through a sleeve and secured by a bolt. The flange 11 is glued over the back cane 10 via connecting member 11'. The hole 12'" and the slot 11'" at each of the end formations 11" and 12" of the curved flange 11 and cane support insert 12 respectively, provide for a similar inclination as described herein above with respect to FIGS. 10 and 11.

Figure 13A:
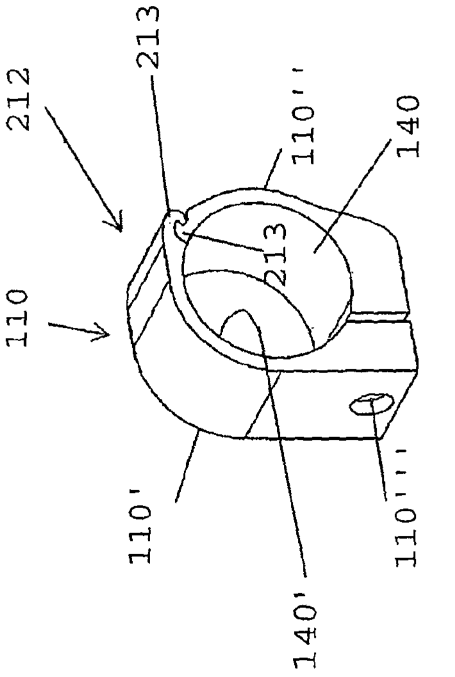
FIG. 13*a* is a side elevation view of the universal clamp of the wheelchair of FIG. 1.
Figure 13B:
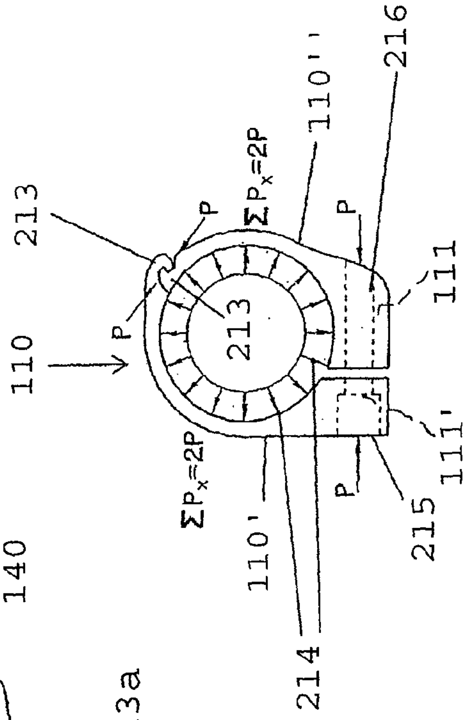
FIG. 13*b* is a perspective view of the universal clamp of FIG. 13*a*.
Figure 13C:
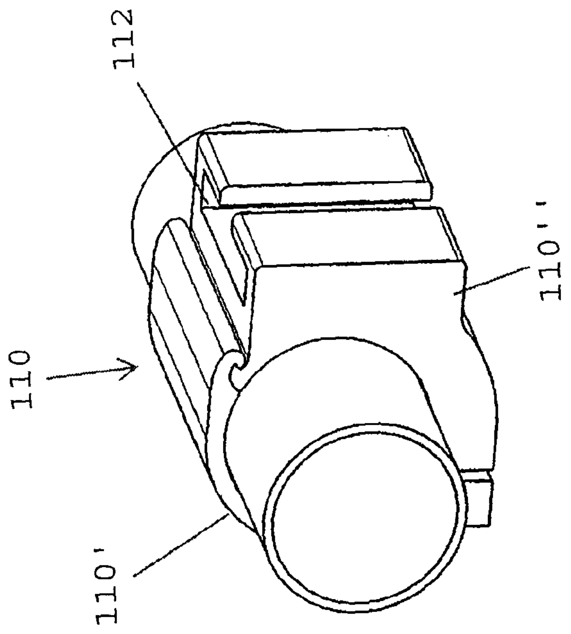
FIG. 13*c* is a perspective view of the universal clamp of FIG. 13*a* with a side insertion portion.

Now referring to FIGS. 13*a*, 13*b* and 13*c*, the universal clamp 110 consists of two sections 110' and 110", each defining an arcuate clamping face 140 and 140' and is made to be light and compact, and is used in various ways to assemble the wheelchair as exemplified in FIG. 1. The universal clamp 110 can be used, for example, as: a rear wheel mounting clamp and a rear tie down bracket (above and below wheel post 80); and a front wheel adjustment mechanism (such as clamp 50). The universal clamp 110 is made of an extrusion process and can be transversely cut to different widths varying between 0.375 to 1.75 inches for example, depending of the specific application of the clamp. Each section 110' and 110" has an interlocking mechanism 212 that permits the clamp to be split in two parts 110' and 110" without the use of tools. The interlocking mechanism 212 consists of a locking ridge formation 213 at each end of free end sections 110' and 110". The ridge formation 213 is configured to provide a strong gripping connection to reduce stress. A bore 215 is provided at the base of section 110' to receive the head 111' of a screw bolt 111. The other section 110'" has a threaded bore 216 to engage with the threaded shank of the bolt 111. The clamp can be used to clamp various elements such as a standalone T-type armrest, a U-type armrest and a standalone clothe guard 100. The universal clamp 110 can also be adapted to incorporate a hook-like feature 105 or additional attachment features 112 on either portion 110' or 110" in order to attach the clamp 110 to other elements. For example, the universal clamp 110 can be used instead of hook support 105, as shown in FIG. 7*b*.

FIG. 2*c* shows the brake assembly 135 connectable to the tubular member 71 of each side frame by the clamp 104. The brake assembly 135 has an actuating lever 106 connected to a brake friction rod 136 through a connecting linkage 137, whereby to brake the wheels 86.

Figure 12A:
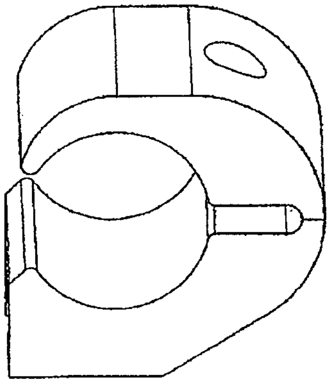
Fig. 12a Prior Art
FIG. 12*a* is a perspective view of a clamp used for a wheelchair in accordance with the prior art.
Figure 12B:
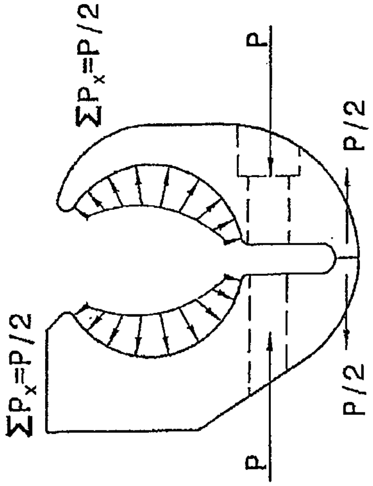
Fig. 12b Prior Art
FIG. 12*b* is a side elevation view of the clamp of FIG. 12*a;*

FIGS. 12*a* and 12*b* are provided to illustrate clamps generally used in the prior art. Unlike for prior art clamps, the universal clamp 110, as illustrated in FIGS. 13*a* to 13*c*, distributes the clamping force equally around a tubular member as indicated by arrows 214 in FIG. 13*b*. This reduces local forces which may create flexion of the tubular member being clamped. The shape of the universal clamp 110 of FIGS. 13*a* to 13*c* also offers a clamping force ΣPx that is about double of the tension force P in the clamping bolt 111. This provides for an effective blockage of any rotational movement there between.

One can therefore appreciate that the modular construction of the wheelchair as above described is formed essentially of light weight tubular members molded from polymer matrix composite material which provide for a very rigid, light weight and shock absorbing frame making the wheelchair sturdy, shock absorbing, vibration damping and easily transportable. The shock absorption is provided from the overall structural construction whereby the material is both resilient and can withstand slight displacement at each of the connecting joints. The wheelchair can be folded together by an easy coupling disconnection of the cross arms permitting the folding of the side frames towards one another. Also, to reassemble the wheelchair in an operating position, it is merely necessary to place the seat cross-brace tubes 31 in clamping engagement with the clamps 104 by pressing the brace tube 31 in snug fit engagement with the clamps 104. Therefore there is a quick connect and disconnect feature of the foldable wheelchair. The tubular construction and molded tubular parts also provide for ease of customizing a wheelchair to an intended user seeing that the seating section is configurable along three different axes by adjusting the lengths of the frame tubular members. Accordingly, a wheelchair can be assembled very quickly to fit an intended user. The adjustability and support of the rear wheel is also one that is light weight and extremely solid while permitting adjustment of the wheels both in the vertical direction and also horizontally by adjusting the position of the wheel mounting brace with its associated rectangular side frame.

It is within the ambit of the present invention to cover any obvious modifications over the preferred embodiments described herein, provided such modifications fall within the scope of the appended claims.

We claim:

1. A light weight foldable and customizable wheelchair comprising a tubular frame formed at least in part of molded polymer matrix composite material tubes and connectors, said wheelchair having two side frame tubular assemblies interconnected in side-by-side relationship by a pair of cross-brace members, said side frame tubular assemblies defining a seating section therebetween, a rear wheel mounting post assembly secured to each said side frame assemblies adjacent a rear end section thereof for securing a rear wheel to each said side frame tubular assemblies at a desired selected position, said rear wheel mounting post assembly having an adjustable mounting post with a plurality of axle receiving holes disposed along an axle support axis extending vertically through said mounting post, and a clamp at opposed ends of said adjustable mounting post for engagement with opposed horizontal tubular members of said side frame tubular assemblies, said opposed horizontal tubular members having rib formations extending perpendicular to said horizontal tube members to provide immovable retention of said clamps, said clamp at opposed ends of said mounting post providing horizontal displacement and securement of said mounting post to a desired position in said side frame tubular assemblies, a front wheel assembly secured to a lowermost front end of each said side frame tubular assemblies, said seating section being configurable along three axes; each said side frame tubular assemblies being adjustable in depth and in height, constituting a first and second of said three axes, by forming or cutting tubes of said side frame tubular assemblies to a desired length and gluing same to associated ones of said connections; each cross-brace member of said pair of cross-brace members having a cross-brace connecting tube adjustable in length to provide a width adjustment constituting a third of said three axes, of said side frame tubular assemblies; a pair of back canes secured to said two side frame tubular assemblies and a seat and backrest support secured respectively to said side frame tubular assemblies and said pair of back canes.

2. A light weight foldable and customizable wheelchair as claimed in claim 1 wherein each said side frame tubular assemblies are substantially rectangular tubular side frame assemblies each comprised of a first straight upper tubular member to cut to a first desired length to provide said depth adjustment; two transverse connectors each at opposed ends of the first straight upper tubular member; a molded tubular member having a front vertical tubular arm, and a transverse horizontal tubular connector interconnected together through a molded head tube sleeve integrally formed therewith, said front vertical tubular arm having a free end for cutting same to a second desired length to provide said height adjustment; a horizontal straight lower tubular member cut to the first desired length forming two free ends, one being connected to the transverse horizontal tubular connector; a third rear vertical tubular member cut to the second desired length forming two respective free ends; and a lower rear transverse connector at one end as the third rear vertical tubular member; said free end of the vertical tubular arm, another one of said two free ends of said horizontal straight lower tubular member and another one of the respective free ends of the third rear vertical tubular member each being received in associated ones of said transverse connectors for securement therein by glue to form said rectangular tubular side frame.

3. A light weight foldable and customizable wheelchair as claimed in claim 2 wherein said first straight upper tubular member, said horizontal straight lower tubular member and said third rear vertical tubular member are one of molded, rolled and extruded with said polymer matrix composite material, and wherein said two transverse connectors, said molded tubular member and straight lower rear transverse connector are molded of said polymer matrix composite material.

4. A light weight foldable and customizable wheelchair as claimed in claim 2 wherein said cross brace connecting tube is provided with a connecting damp at a lower end for pivotal connection to said horizontal tubular member of said molded tubular member of one of said rectangular tubular side frame, and a clamping member at an opposite upper end for removable connection with said first straight upper tubular member of the other of said rectangular tubular side frame, and a link rod pivotally connected at one end to said first straight upper tubular member of the other of said rectangular tubular side frame and at an opposed end to said cross-brace connecting tube.

5. A light weight foldable and customizable wheelchair as claimed in claim 4 wherein said pair of cross-brace members are pivotally interconnected together on a pivot connection at about a mid-length thereof whereby to cause said rectangular tubular side frames to be folded one adjacent the other.

6. A light weight foldable and customizable wheelchair as claimed in claim 5, wherein said link rod is a flexible link rod to release tension in the backrest support when said rectangular tubular side frames are folded adjacent each other.

7. A light weight foldable and customizable wheelchair as claimed in claim 2 wherein said rear wheel mounting post assembly is formed by a machined rectangular tubular extrusion member, said tubular extrusion member having opposed flat side walls.

8. A light weight foldable and customizable wheelchair as claimed in claim 1, wherein the axle receiving holes are formed at an angle extending in a range of 0 to 12 degrees, from the horizontal for providing a camber to the rear wheel.

9. A light weight foldable and customizable wheelchair as claimed in claim 4 wherein universal clamps are connected to tubular members and said horizontal tubular member of said molded tubular member of said rectangular tubular side frame assembly at a desired position to provide interconnection with associated members of said wheelchair, the universal clamps each having two separate interconnectable clamp sections which engage together via a securing bolt and an integrally formed locking ridge in each said sections, the securing bolt providing securement of said clamp to said reinforced brace member with said locking ridge providing for interconnection of said parts together with said ridges interlocking with one another.

10. A light weight foldable and customizable wheelchair as claimed in claim 2 wherein said back canes are angularly adjustable back canes comprised of a straight vertical tube section having upper handle sections and a lower curved flange connector formation, a cane support insert secured in an open top end of a rear one of said transverse connectors, said cane support insert having a curved connecting end formation for facial arresting coupling with said curve flange connector formation to connect said cane at a desired rearwardly inclined angle.

11. A light weight foldable and customizable wheelchair as claimed in claim 1, further comprising a universal clamp for clamping about a wheelchair tubular member, the universal clamp comprising:

two separate clamp sections having an arcuate clamping face, each said damp section having a main body having two opposite ends, one of the two opposite ends of each one of the two separate damp sections comprising an interlocking ridge formation formed at a straight horizontal free end thereof to provide a gripping connection when mated together, and another one of the two opposite ends of each one of the two separate members forming a base having an opening for receiving a bolt therein, the bolt and the interlocking ridge formation securing the two separate clamp sections together at their two opposite ends to clamp about said tubular member of a wheelchair, the universal clamp equally distributing a clamping force around the tubular member upon application of a tension force by the securement of the bolt.

12. A light weight foldable and customizable wheelchair further comprising a universal clamp as claimed in claim 11, wherein at least one of the two clamp sections has an integrally formed attachment element for securement of another wheelchair member thereto.

13. A light weight foldable and customizable wheelchair further comprising a universal clamp as claimed in claim 12, wherein said other wheelchair member is one of an armrest or a clothes guard, or a brake assembly of said wheelchair.

14. A light weight foldable and customizable wheelchair further comprising a universal clamp as claimed in claim 12, wherein said another wheelchair member is another tubular member retained in side-by-side relationship.

15. A light weight foldable and customizable wheelchair further comprising a universal clamp as claimed in claim 12, wherein said another wheelchair member is a wheel connecting post of said wheelchair.

* * * * *